(12) United States Patent
Yang et al.

(10) Patent No.: US 8,906,337 B2
(45) Date of Patent: Dec. 9, 2014

(54) METHOD FOR PREPARING GRAPHENE BY USING TWO-DIMENSIONAL CONFINED SPACE BETWEEN THE LAYERS OF INORGANIC LAYERED MATERIALS

(75) Inventors: Wensheng Yang, Beijing (CN); Jie Sun, Beijing (CN); Haimei Liu, Beijing (CN); Xu Chen, Beijing (CN); Xue Duan, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 13/980,715

(22) PCT Filed: Mar. 27, 2012

(86) PCT No.: PCT/CN2012/073108
§ 371 (c)(1),
(2), (4) Date: Jul. 19, 2013

(87) PCT Pub. No.: WO2013/120307
PCT Pub. Date: Aug. 22, 2013

(65) Prior Publication Data
US 2014/0154165 A1 Jun. 5, 2014

(30) Foreign Application Priority Data
Feb. 17, 2012 (CN) .......................... 2012 1 0038611

(51) Int. Cl.
*C01B 31/04* (2006.01)
(52) U.S. Cl.
CPC ............. *C01B 31/0446* (2013.01); *C01B 31/04* (2013.01); *Y10S 977/789* (2013.01)
USPC ....................................... 423/445 R; 977/789
(58) Field of Classification Search
CPC . C01B 31/0446; C01B 31/0293; B01J 20/205
USPC ............... 423/445 B, 460; 977/755, 758, 759
See application file for complete search history.

(56) References Cited

PUBLICATIONS

Zhang, W. et al., "A Strategy for Producing Pure Single-Layer Graphene Sheets Based on a Confined Self-Assembly Approach," Angewandte Chemie 121(32):5978-5982, Jul. 27, 2009.
Novoselov, K.S. et al., "Electric Field Effect in Atomically Thin Carbon Films," Science 306(5696):666-669, Oct. 22, 2004.
Kim, Keun Soo et al., "Large-Scale Pattern Growth of Graphene Films for Stretchable Transparent Electrodes," Nature 457(7230):706-710, Feb. 5, 2009.

*Primary Examiner* — Richard M Rump
(74) *Attorney, Agent, or Firm* — Schwabe Williamson & Wyatt PC

(57) ABSTRACT

The present invention relates to a method for preparing graphene using the two-dimensional confined space between the layers of inorganic layered materials. Such method comprises the following steps: mix a soluble salt of a divalent metal ion $M^{2+}$, a soluble salt of a trivalent metal ion $M'^{3+}$, a soluble salt of a chain alkyl anion $A^-$ and a carbon source molecule C and dissolve them in deionized and $CO_2$-eliminated water to prepare a mixed salt solution; mix the mixed salt solution with an alkali solution under nitrogen protection and subject them to reaction and crystallization under nitrogen, and filter the suspension obtained thereafter and wash the filter cake with deionized water until the pH of the filtrate is 7 to 7.5, and then dry the filter cake to obtain layered double hydroxides with an intercalated structure; under an inert atmosphere or a reducing atmosphere, calcinate the layered double hydroxides with an intercalated structure to provide a calcinated product; add the calcinated product into a hydrochloric acid solution for ultrasonic treatment, and separate the solution by centrifugation and wash the precipitate obtained by centrifugation with deionized water until the pH of the filtrate is 6.5 to 7 to obtain the graphene.

20 Claims, 4 Drawing Sheets

METHOD FOR PREPARING GRAPHENE BY USING TWO-DIMENSIONAL CONFINED SPACE BETWEEN THE LAYERS OF INORGANIC LAYERED MATERIALS

TECHNICAL FIELD

The present invention relates to a method for preparing graphene, further relates to a method for preparing graphene using the two-dimensional confined space between the layers of inorganic layered materials, which falls in the field of carbon nanomaterial preparation.

BACKGROUND

Graphene is a two-dimensional (2D) carbon nanomaterial in which the arrangement of carbon atoms is identical to that in a single atomic layer of graphite, and generally refers to a 2D carbon layered structure stacked with less than 10 carbon atom layers. Since the number of layers of graphene has direct impact on the distribution of the electron cloud thereof, graphenes with various number of layers have different optical and electric performances, and the controlled synthesis of graphenes with various number of layers is beneficial in practical applications. Novoselov et al. (K. S. Novoselov, A. K. Geim, S. V. Morozov, D. Jiang, Y. Zhang, S. V. Dubonos, I. V. Grigorieva and A. A. Firsov, Electric field effect in atomically thin carbon films, Science, 2004, 306: 666-669) employed a mechanical peeling method to peel single-layer and multi-layer graphene thin films from highly oriented pyrolytic graphene and observe them, but such preparation method is difficult to control and scale up; Kim et al. (K. S. Kim, Y. Zhao, H. Jang, S. Y. Lee, J. M. Kim, K. S. Kim, J.-H. Ahn, P. Kim, J.-Y. Choi and B. H. Hong, Large-scale pattern growth of graphene films for stretchable transparent electrodes, Nature, 2009, 457: 706-710) utilized a chemical vapor deposition method to deposit various number of layers of graphene on a nickle substrate using methane as the carbon source, but such method used a gaseous carbon source which might cause safety issues during storage and in the process of reaction and could not produce graphene in large scale. Zhang et al. (W. Zhang, J. Cui, C. Tao, Y. Wu, Z. Li, L. Ma, Y. Wen and G. Li, A Strategy for producing pure single-layer graphene sheets based on a confined self-assembly approach, Angew. Chem. Int. Ed., 2009, 48: 5864-5868) designed and synthesized a novel amphiphilic molecule having a polymerisable pyrrole group and used it as a structure inducer and a carbon source to prepare a mesoporous silica with a layered structure, and to prepare a single-layered graphene by in situ polymerization of the preorganized pyrrole groups in the mesopores and carbonization using the 2D reaction microcavity formed by the silica, but this method has a high requirement for the amphiphilic molecule which needs specialized design and synthesis, and the 2D template formed by the amphiphicle molecule was poorly stable and may fail in controlled synthesis.

SUMMARY OF THE INVENTION

To solve the abovementioned technical problems, an object of the invention is to provide a method for preparing graphene using the two-dimensional confined space between the layers of inorganic layered materials, which method utilizes a liquid carbon source to synthesize graphene with various number of layers under control and is advantageous due to its wide range of raw material sources as well as stability and safety.

For the above purpose, it is provided in the invention that a method for preparing graphene which utilizes the 2D confined space between the layers of inorganic layered materials, wherein, a chain alkyl anion and a carbon source molecule are intercalated into the layers of layered double hydroxides, the layered double hydroxides after the intercalation is then calcinated under an inert atmosphere or a reducing atmosphere while the carbon source molecule grows into graphene within a 2D confined space and the layered double hydroxides are converted to metal oxide upon the dehydration of layers, and graphene is obtained after removal of the metal oxide by acid dissolution. The graphene preparation method provided by the invention comprises the following steps and the process of which is shown in FIG. 1:

(1) mix a soluble salt of a divalent metal ion $M^{2+}$, a soluble salt of a trivalent metal ion $M^{3+}$, a soluble salt of a chain alkyl anion $A^-$ and a carbon source molecule C and dissolve them in deionized and $CO_2$-eliminated water to prepare a mixed salt solution;

mix the mixed salt solution with a alkali solution under nitrogen protection and subject them to reaction and crystallization at 60° C. to 80° C. for 6 to 10 hours under nitrogen, filter the suspension obtained thereafter and wash the filter cake with deionized water until the pH of the filtrate is 7 to 7.5, and then dry the filter cake at 50° C. to 60° C. for 6 to 12 hours to obtain a layered double hydroxides with an intercalated structure having a general chemical structure of:

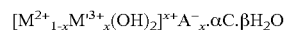

$$[M^{2+}_{1-x}M^{3+}_x(OH)_2]^{x+}A^-_x \cdot \alpha C \cdot \beta H_2O$$

wherein, x is 0.2-0.33, α is 0.2-6.6, and β is 0.3-3;

(2) under an inert atmosphere or a reducing atmosphere, calcinate the layered double hydroxides with an intercalated structure to provide a calcinated product at a calcination temperature of 700° C. to 950° C. for a period of time of 0.5 to 3 hours;

(3) add the calcinated product into a hydrochloric acid solution with a concentration of 5 wt % for ultrasonic treatment, and separate the solution by centrifugation and wash the precipitate obtained by centrifugation with deionized water until the pH of the filtrate is 6.5 to 7 to obtain graphene.

In the layered double hydroxides with an intercalated structure, the divalent metal ion $M^{2+}$ and the trivalent metal ion $M^{3+}$ are located in the main body layer, wherein, x is the molar ratio of $M^{3+}/(M^{2+}M^{3+})$, α is the number of the carbon source molecule C located between the layered double hydroxides layers, and β is the number of $H_2O$ molecules present between the layered double hydroxides layers.

In the above preparation method provided in the present invention, preferably, in step (1), the soluble salt of the divalent metal ion $M^{2+}$ is one or more of a nitrate, a sulfate, an oxalate or a chloride of Mg or Zn; and the soluble salt of the trivalent metal ion $M^{3+}$ is one or more of a nitrate, a sulfate, an oxalate or a chloride of Al.

In the preparation method provided in the present invention, the molar ratio between the divalent metal ion $M^{2+}$ and the trivalent metal ion $M^{3+}$ is preferably 2 to 4:1.

In the preparation method provided in the present invention, preferably, in the mixed salt solution in step (1), the overall concentration of the divalent metal ion $M^{2+}$ and the trivalent metal ion $M^{3+}$ is 0.2 to 0.5 mol/L.

In the preparation method provided in the present invention, preferably, in step (1), the soluble salt of the chain alkyl anion $A^-$ is one or more of sodium dodecyl sulfate, sodium dodecyl sulfonate, sodium dodecyl benzene sulfonate, potassium dodecyl sulfate, potassium dodecyl sulfonate and potassium dodecyl benzene sulfonate. More preferably, the above soluble salt of the chain alkyl anion A⁻ is sodium dodecyl sulfate.

In the preparation method provided in the present invention, preferably, in the mixed salt solution in step (1), the number of moles of the chain alkyl anion A⁻ is equivalent to the number of moles of the trivalent metal ion $M^{t3+}$.

In the preparation method provided above in the present invention, preferably, in step (1), the carbon source molecule C is one or more of methyl methacrylate, n-pentane, benzene, toluene, xylene, and styrene.

In the preparation method provided above in the present invention, preferably, in the mixed salt solution in step (1), the number of moles of the carbon source molecule C is 1 to 20 times of the number of moles of the trivalent metal ion $M^{t3+}$.

In the preparation method provided above in the present invention, preferably, in step (1), the alkali solution is a solution prepared by dissolving sodium hydroxide or potassium hydroxide into deionized and $CO_2$-eliminated water with a concentration of 2 to 5 mol/L.

In the preparation method provided above in the present invention, preferably, in step (1), the number of moles of the alkali in the alkali solution is twice of the total number of moles of the divalent metal ion $M^{2+}$ and the trivalent metal ion $M^{t3+}$.

In the preparation method provided above in the present invention, preferably, in step (2), the inert atmosphere is a nitrogen atmosphere or an argon atmosphere, and the reducing atmosphere is a hydrogen atmosphere.

In the preparation method provided above in the present invention, preferably, during the ultrasonic treatment in step (3), the solid to liquid ratio between the calcinated product and the HCl solution (calcinated product/HCl solution) is 2 to 7 g/L.

In the preparation method provided above in the present invention, preferably, in step (3), the duration of the ultrasonic treatment is 0.5 to 2 hours.

In the preparation method provided above in the present invention, preferably, in step (3), the revolution rate for the centrifugation is 5000 to 9000 rpm.

The structure of the graphene prepared is characterized with a high-resolution transmission electron microscope (TEM) as shown in FIG. 5, FIG. 7, FIG. 8 and FIG. 10, and the graphene obtained using the preparation method provided in the present invention may have a single-layer, 2-to-3-layer, multi-layer (4 to 6 layers) structure. The structure of the prepared graphene is characterized by using Raman spectroscopy as shown in FIG. 11, and the variation of layers of graphene can be analyzed according to the variation of the location, symmetry and intensity of the 2D peak, which is consistent with the observation results obtained using the high-resolution TEM.

The method for preparing graphene provided in the present invention has advantages such as simple operation processes, capability of producing graphene with a regular structure and controllable number of layers in large scale. Further, liquid carbon sources are utilized in this preparation method, which is beneficial due to the wide range of raw material sources as well as good stability and safety and is promising in the future.

DETAILED MODES OF EMBODIMENT

Example 1

Figure 1:
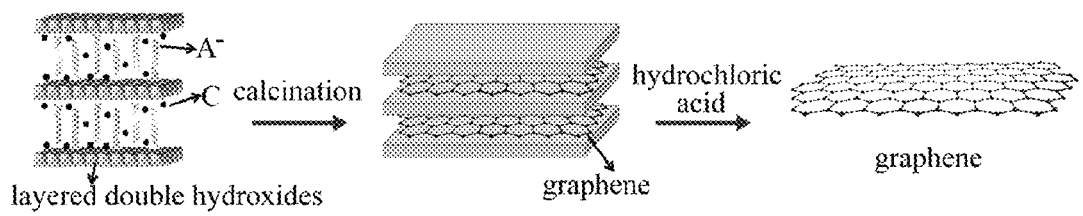
FIG. 1 is a schematic flow chart of the method for preparing graphene provided in the present invention.
Figure 2:
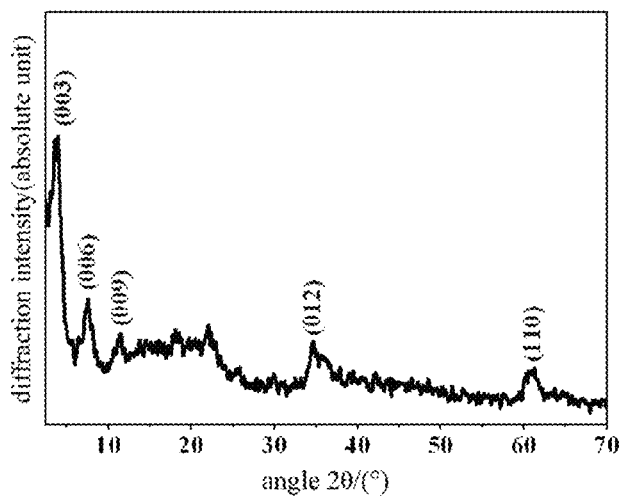
FIG. 2 is an X-ray diffraction spectrum of the layered double hydroxides LDH-1 with an intercalated structure prepared according to Example 1, wherein the x-axis represents angle 2θ in the unit of degree (°) and y-axis represents the intensity of diffraction in the unit of absolute unit (a.u.)
Figure 3:
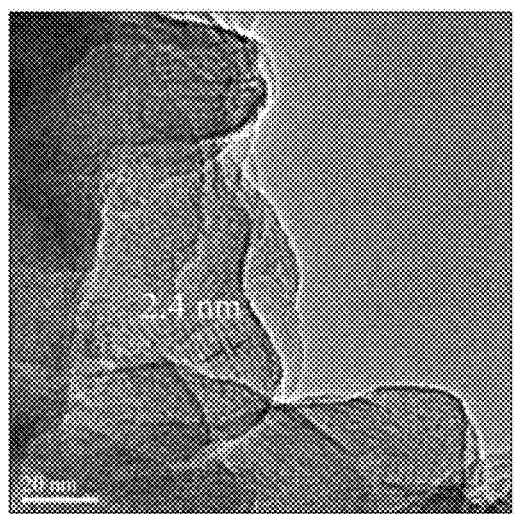
FIG. 3 is a high-resolution transmission electron microscope (TEM) photograph of the layered double hydroxides LDH-1 with an intercalated structure prepared according to Example 1.
Figure 4:
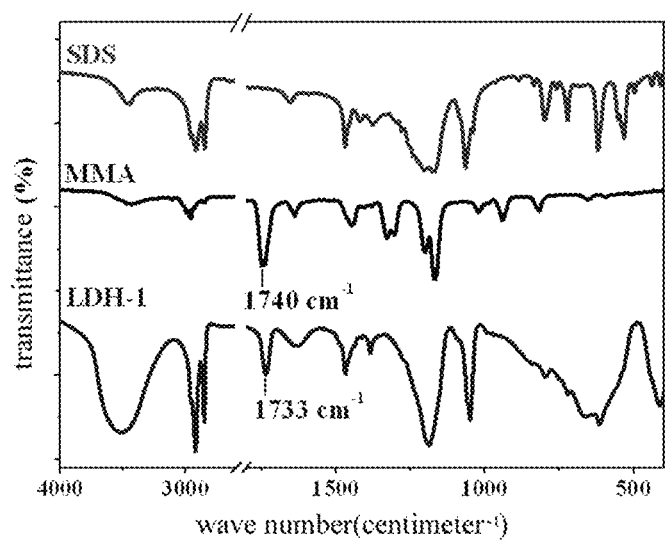
FIG. 4 is IR spectra of methyl methacrylate (MMA), sodium dodecyl sulfate (SDS) and the layered double hydroxides LDH-1 with an intercalated structure in Example 1, wherein the x-axis represents wavenumber in the unit of $cm^{-1}$, and the y-axis represents transmission in the unit of percentage (%)

In the present example, a method for preparing graphene including the following steps is provided:

(1) Dissolve 0.075 mol magnesium nitrate hexahydrate, 0.025 mol aluminum nitrate nonahydrate, 0.025 mol sodium dodecyl sulfate (SDS) and 0.03 mol methyl methacrylate (MMA) in 300 mL deionized and $CO_2$-eliminated water, mix with stirring under nitrogen protection to give a clear and transparent mixed salt solution;

under constant stirring with nitrogen protection, 80 mL of a 2.5 mol/L NaOH solution prepared with deionized and $CO_2$-eliminated water is dripped into the above mixed salt solution to obtain a mixture solution;

under a nitrogen atmosphere, subject the above mixture solution to reaction at 80° C. for 8 hours, filter the suspension thus obtained, wash the filter cake with deionized water until the pH of the filtrate is 7.2, and then dry the filter cake at 50° C. for 12 hours to obtain a layered double hydroxides with an intercalated structure designated as LDH-1. FIG. 2 is an X-ray diffraction spectrum of LDH-1. Based on the data provided in FIG. 2, it suggests that LDH-1 has a layered structure and the 003 peak characterizes an interlayer spacing of 2.4 nm. FIG. 3 is a high-resolution TEM photo of LDH-1. It can be seen in FIG. 3 that the 003 interplanar spacing of this LDH-1 is 2.4 nm. FIG. 4 is IR spectra of SDS, MMA and LDH-1. As seen in FIG. 4, the characteristic peaks of MMA undergoes substantial transition before and after intercalation: after MMA intercalation, the C—O bond shifts to lower wavenumber due to the interaction between the O atom in the C—O bond and the hydroxy group on the layered double hydroxide layer, demonstrating that MMA in fact intercalates into the layers of the layered double hydroxides. The ratio of metal elements is determined using inductively coupled plasma atomic emission spectroscopy (ICP-AES) as shown in Table 1. The contents of the four elements C, H, O, S (in mass %) with respect to the overall mass as determined using organic elemental analysis are shown in Table 2. The chemical composition is calculated as shown below:

$$[Mg^{2+}_{0.75}Al^{3+}_{0.25}(OH)_2]^{0.25+}(DS^-)_{0.25} \cdot 0.28MMA \cdot 2.4H_2O.$$

TABLE 1

Data obtained by ICP-AES

| Concentration of Elements (ppm) | | |
|---|---|---|
| Mg | Al | nMg/nAl |
| 35.33 | 13.25 | 3/1 |

TABLE 2

Data obtained by organic elemental analysis
Mass Contents of Elements (mass %)

| O | C | S | H |
|---|---|---|---|
| 39.43 | 26.91 | 4.08 | 7.79 |

(2) Under a nitrogen atmosphere, the abovementioned layered double hydroxides with an intercalated structure is calcinated at 900° C. for 1 hour, and the calcinated product is obtained.

(3) Add 1 g calcinated product into 200 mL of a 5 mass % HCl solution and subject it to ultrasonic treatment for 1 hour, and then centrifuge at a revolution rate of 9000 rpm for 1 minute, and filter and wash the precipitate from the lower layer obtained by centrifugation with deionized water until the pH of the filtrate is 6.5 to provide the final product graphene G1.

Figure 5:
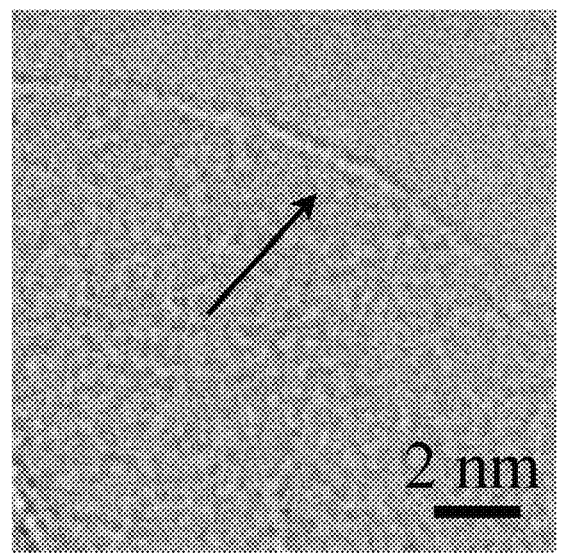
FIG. 5 is a high-resolution TEM photograph of the single-layer graphene G1 prepared in Example 1.
Figure 11:
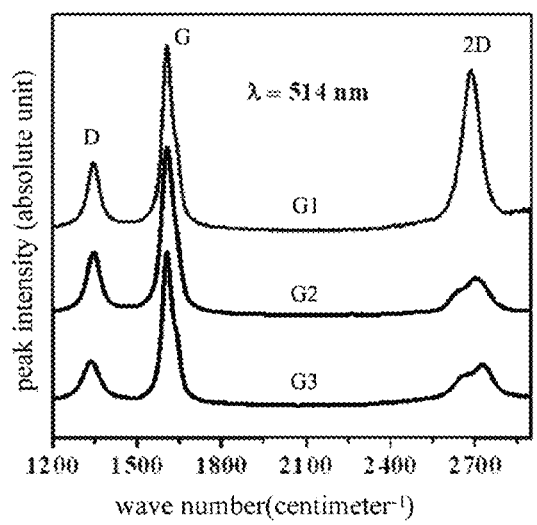
FIG. 11 is Raman spectra of the graphene G1, G2, and G3 prepared in Example 1, 2 and 3, wherein the x-axis represents wavenumber in the unit of $cm^{-1}$, and the y-axis represents intensity of peaks in the unit of percentage (%).

FIG. 5 is a high-resolution TEM photo of G1, and shows that the number of layer of the graphene G1 is one layer (as indicated by the arrow). FIG. 11 shows a Raman spectrum of G1, in which the 2D peak locates at 2683 cm$^{-1}$ with a symmetric and sharp shape and high intensity, indicating that G1 is a single-layer graphene.

Example 2

Figure 6:
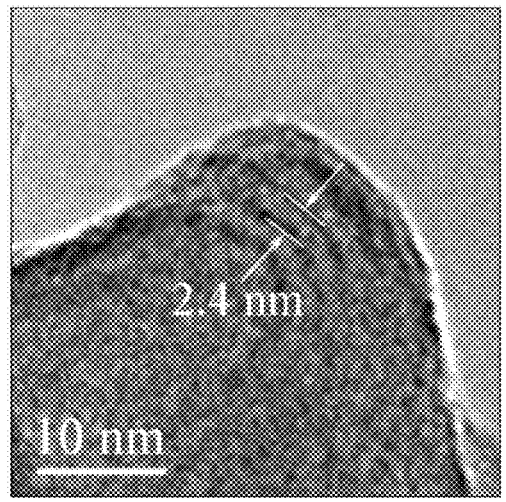
FIG. 6 is a high-resolution TEM photograph of the layered double hydroxides LDH-2 with an intercalated structure prepared according to Example 2.

In the present example, a method for preparing graphene including the following steps is provided:

(1) Dissolve 0.05 mol magnesium nitrate hexahydrate, 0.025 mol aluminum nitrate nonahydrate, 0.025 mol SDS and 0.22 mol MMA in 150 mL deionized and CO$_2$-eliminated water, mix with stirring under nitrogen protection to give a clear and transparent mixed salt solution; under constant stirring with nitrogen protection, 30 mL of a 5 mol/L NaOH solution prepared with deionized and CO$_2$-eliminated water is dripped into the above mixed salt solution to obtain a mixture solution; under a nitrogen atmosphere, subject the above mixture solution to reaction at 70° C. for 10 hours, filter the suspension thus obtained, wash the filter cake with deionized water until the pH of the filtrate is 7.5, and then dry the filter cake at 60° C. for 8 hours to obtain layered double hydroxides with an intercalated structure designated as LDH-2. FIG. 6 is a high-resolution TEM photo of LDH-2. As seen in FIG. 6, the 003 interplanar spacing of this LDH-2 is 2.4 nm. The ratio of metal elements is determined using ICP-AES as shown in Table 3. The contents of the four elements C, H, O, S (in mass %) with respect to the overall mass as determined using organic elemental analysis are shown in Table 4. The chemical composition is calculated as shown below:

$$[Mg^{2+}_{0.75}Al^{3+}_{0.25}(OH)_2]^{0.25+}(DS^-)_{0.25} \cdot 1.1MMA \cdot 0.9H_2O.$$

TABLE 3

Data obtained by ICP-AES

| Concentration of Elements (ppm) | | |
|---|---|---|
| Mg | Al | nMg/nAl |
| 60.10 | 22.54 | 3/1 |

TABLE 4

Data obtained by organic elemental analysis
Mass Contents of Elements (mass %)

| O | C | S | H |
|---|---|---|---|
| 31.69 | 40.60 | 3.18 | 7.50 |

(2) Under a nitrogen atmosphere, the abovementioned layered double hydroxides with an intercalated structure is calcinated at 700° C. for 3 hours, and the calcinated product is obtained.

(3) Add 1 g calcinated product into 500 mL of a 5 mass % HCl solution and subject it to ultrasonic treatment for 0.5 hour, and then centrifuge at a revolution rate of 7000 rpm for 5 minutes, and filter and wash the precipitate from the lower layer obtained by centrifugation with deionized water until the pH of the filtrate is 7.0 to provide the final product graphene G2.

Figure 7:
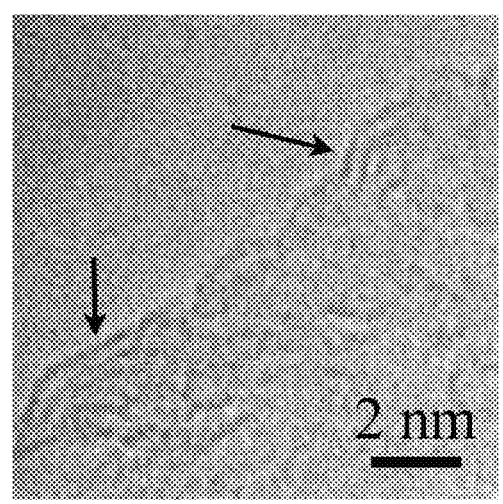
FIG. 7 is a high-resolution TEM photograph of the two-layer graphene G2 prepared in Example 2.
Figure 8:
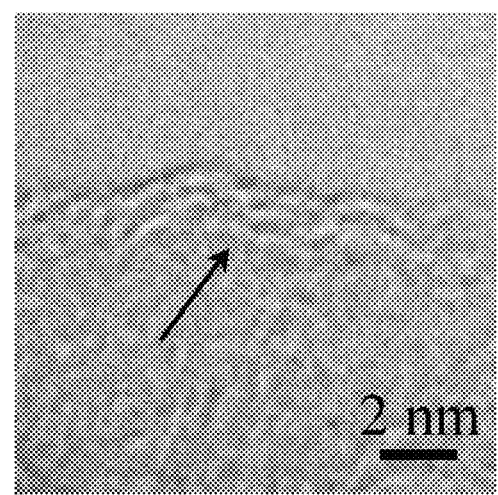
FIG. 8 is a high-resolution TEM photograph of the three-layer graphene G2 prepared in Example 2.

FIG. 7 and FIG. 8 are high-resolution TEM photos of G2 in different regions respectively, showing that the number of layers of the graphene G2 is 2 to 3 layers (as indicated by the arrow). FIG. 11 shows a Raman spectrum of G2, in which the 2D peak locates at 2702 cm$^{-1}$ with a less symmetric shape and lower intensity as compared to that of G1, indicating that the number of layers of the graphene G2 has increased and G2 is a 2-to-3-layer graphene.

Example 3

Figure 9:
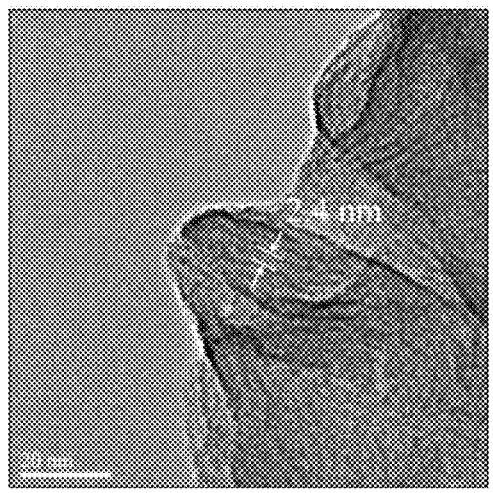
FIG. 9 is a high-resolution TEM photograph of the layered double hydroxides LDH-3 with an intercalated structure prepared according to Example 3.

In the present example, a method for preparing graphene including the following steps is provided:

(1) Dissolve 0.1 mol magnesium nitrate hexahydrate, 0.025 mol aluminum nitrate nonahydrate, 0.025 mol SDS and 0.5 mol MMA in 300 mL deionized and CO$_2$-eliminated water, mix with stirring under nitrogen protection to give a clear and transparent mixed salt solution; under constant stirring with nitrogen protection, 125 mL of a 2 mol/L NaOH solution prepared with deionized and CO$_2$-eliminated water is dripped into the above mixed salt solution to obtain a mixture solution; under a nitrogen atmosphere, subject the above mixture solution to reaction at 60° C. for 6 hours, filter the suspension thus obtained, wash the filter cake with deionized water until the pH of the filtrate is 7.0, and then dry the filter cake at 55° C. for 6 hours to obtain layered double hydroxides with an intercalated structure designated as LDH-3. FIG. 9 is a high-resolution TEM photo of LDH-3. As seen in FIG. 9, the 003 interplanar spacing of this LDH-3 is 2.4 nm. The ratio of metal elements is determined using ICP-AES as shown in Table 5. The contents of the four elements C, H, O, S (in mass %) with respect to the overall mass as determined using organic elemental analysis are shown in Table 6. The chemical composition is calculated as shown below:

$$[Mg^{2+}_{0.75}Al^{3+}_{0.25}(OH)_2]^{0.25+}(DS^-)_{0.25} \cdot 1.9MMA \cdot 0.3H_2O.$$

TABLE 5

Data obtained by ICP-AES

| Concentration of Elements (ppm) | | |
|---|---|---|
| Mg | Al | nMg/nAl |
| 50.55 | 18.96 | 3/1 |

TABLE 6

Data obtained by organic elemental analysis
Mass Contents of Elements (mass %)

| O | C | S | H |
|---|---|---|---|
| 29.84 | 46.82 | 2.50 | 7.51 |

(2) Under a nitrogen atmosphere, the abovementioned layered double hydroxides with an intercalated structure is calcinated at 800° C. for 0.5 hour, and the calcinated product is obtained.

(3) Add 1 g calcinated product into 500 mL of a 5 mass % HCl solution and subject it to ultrasonic treatment for 1.5 hours, and then centrifuge at a revolution rate of 5000 rpm for 7 minutes, and filter and wash the precipitate from the lower layer obtained by centrifugation with deionized water until the pH of the filtrate is 6.8 to provide the final product graphene G3.

Figure 10:
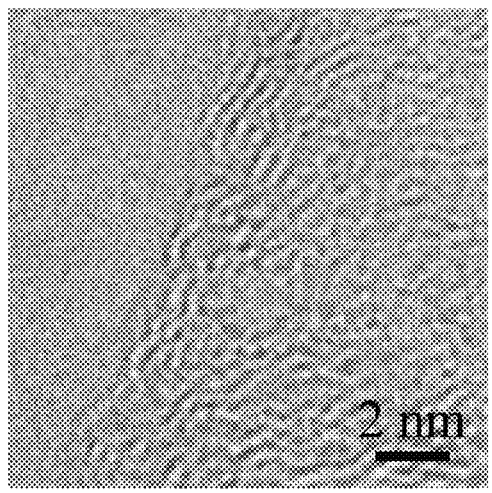
FIG. 10 is a high-resolution TEM photograph of the multi-layer graphene G3 prepared in Example 3.

FIG. 10 is a high-resolution TEM photo of G3, showing that the number of layers of the graphene G3 is multi-layer (4 to 6 layers). FIG. 11 shows a Raman spectrum of G3, in which the 2D peak locates at 2725 cm$^{-1}$ and the symmetry of peak shape further decreases and the peak intensity is further lowered, indicating that the number of layers of the graphene G3 has further increased and G3 is a multi-layer (4-to-6-layer) graphene.

The invention claimed is:

1. A preparation method for graphene, comprising the following steps:
   (1) mix a soluble salt of a divalent metal ion $M^{2+}$, a soluble salt of a trivalent metal ion $M'^{3+}$, a soluble salt of a chain alkyl anion $A^-$ and a carbon source molecule C and dissolve them in deionized and $CO_2$-eliminated water to prepare a mixed salt solution;
   mix the mixed salt solution with an alkali solution under nitrogen protection and subject them to reaction and crystallization at 60° C. to 80° C. for 6 to 10 hours under nitrogen, filter the suspension obtained thereafter and wash the filter cake with deionized water until the pH of the filtrate is 7 to 7.5, and then dry the filter cake at 50° C. to 60° C. for 6 to 12 hours to obtain layered double hydroxides with an intercalated structure having a general chemical structure of:

$$[M^{2+}_{1-x}M'^{3+}_x(OH)_2]^{x+}A^-_x \cdot \alpha C \cdot \beta H_2O$$

wherein, x is 0.2-0.33, α is 0.2-6.6, and β is 0.3-3;
   (2) under an inert atmosphere or a reducing atmosphere, calcinate the layered double hydroxides with an intercalated structure to provide a calcinated product at a calcination temperature of 700° C. to 950° C. for a period of time of 0.5 to 3 hours;
   (3) add the calcinated product into a hydrochloric acid solution with a concentration of 5 wt % for ultrasonic treatment, and separate the solution by centrifugation and wash the precipitate obtained by centrifugation with deionized water until the pH of the filtrate is 6.5 to 7 to obtain the graphene.

2. The preparation method according to claim 1, wherein, in step (1), the soluble salt of the divalent metal ion $M^{2+}$ is one or more of a nitrate, a sulfate, an oxalate or a chloride of Mg or Zn; and the soluble salt of the trivalent metal ion $M'^{3+}$ is one or more of a nitrate, a sulfate, an oxalate or a chloride of Al.

3. The preparation method according to claim 1, wherein, the molar ratio between the divalent metal ion $M^{2+}$ and the trivalent metal ion $M'^{3+}$ is 2 to 4:1.

4. The preparation method according to claim 1, wherein, in the mixed salt solution, the overall concentration of the divalent metal ion $M^{2+}$ and the trivalent metal ion $M'^{3+}$ is 0.2 to 0.5 mol/L.

5. The preparation method according to claim 1, wherein, in step (1), the soluble salt of the chain alkyl anion $A^-$ is one or more of sodium dodecyl sulfate, sodium dodecyl sulfonate, sodium dodecyl benzene sulfonate, potassium dodecyl sulfate, potassium dodecyl sulfonate and potassium dodecyl benzene sulfonate.

6. The preparation method according to claim 1, wherein, in the mixed salt solution in step (1), the number of moles of the chain alkyl anion $A^-$ is equivalent to the number of moles of the trivalent metal ion $M'^+$.

7. The preparation method according to claim 1, wherein, in step (1), the carbon source molecule C is one or more of methyl methacrylate, n-pentane, benzene, toluene, xylene, and styrene.

8. The preparation method according to claim 1, wherein, in the mixed salt solution, the number of moles of the carbon source molecule C is 1 to 20 times of the number of moles of the trivalent metal ion $M'^{3+}$.

9. The preparation method according to claim 1, wherein, in step (1), the alkali solution is a solution prepared by dissolving sodium hydroxide or potassium hydroxide into deionized and $CO_2$-eliminated water with a concentration of 2 to 5 mol/L.

10. The preparation method according to claim 1, wherein, the number of moles of the alkali in the alkali solution is twice of the total number of moles of the divalent metal ion $M^{2+}$ and the trivalent metal ion $M'^{3+}$.

11. The preparation method according to claim 1, wherein, in step (2), the inert atmosphere is a nitrogen atmosphere or an argon atmosphere, and the reducing atmosphere is a hydrogen atmosphere.

12. The preparation method according to claim 1, wherein, in step (3), the solid to liquid ratio between the calcinated product and the HCl solution is 2 to 7 g/L.

13. The preparation method according to claim 1, wherein, in step (3), the duration of the ultrasonic treatment is 0.5 to 2 hours.

14. The preparation method according to claim 1, wherein, in step (3), the revolution rate for the centrifugation is 5000 to 9000 rpm.

15. The preparation method according to claim 2, wherein the molar ratio between the divalent metal ion $M^{2+}$ and the trivalent metal ion $M'^{3+}$ is 2 to 4:1.

16. The preparation method according to claim 2, wherein, in the mixed salt solution, the overall concentration of the divalent metal ion $M^{2+}$ and the trivalent metal ion $M'^{3+}$ is 0.2 to 0.5 mol/L.

17. The preparation method according to claim 5, wherein, in the mixed salt solution in step (1), the number of moles of the chain alkyl anion $A^-$ is equivalent to the number of moles of the trivalent metal ion $M'^{3+}$.

18. The preparation method according to claim 7, wherein, in the mixed salt solution, the number of moles of the carbon source molecule C is 1 to 20 times of the number of moles of the trivalent metal ion $M'^{3+}$.

19. The preparation method according to claim 4, wherein, the number of moles of the alkali in the alkali solution is twice of the total number of moles of the divalent metal ion $M^{2+}$ and the trivalent metal ion $M'^{3+}$.

20. The preparation method according to claim 9, wherein, the number of moles of the alkali in the alkali solution is twice of the total number of moles of the divalent metal ion $M^{2+}$ and the trivalent metal ion $M'^{3+}$.

\* \* \* \* \*